United States Patent
Reichstein et al.

(10) Patent No.: US 8,136,243 B2
(45) Date of Patent: Mar. 20, 2012

(54) METHOD FOR PRODUCING A PISTON FOR AN INTERNAL COMBUSTION ENGINE AND THE THUS PRODUCED PISTON

(75) Inventors: Simon Reichstein, Nuremberg (DE); Lothar Hofmann, Neumarkt (DE); Peter Konrad, Pegnitz (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 998 days.

(21) Appl. No.: 12/088,117

(22) PCT Filed: Aug. 9, 2006

(86) PCT No.: PCT/EP2006/007909
§ 371 (c)(1),
(2), (4) Date: Mar. 26, 2008

(87) PCT Pub. No.: WO2007/039011
PCT Pub. Date: Apr. 12, 2007

(65) Prior Publication Data
US 2008/0250640 A1   Oct. 16, 2008

(30) Foreign Application Priority Data
Sep. 30, 2005   (DE) .......................... 10 2005 047 035

(51) Int. Cl.
*B23P 15/10* (2006.01)
(52) U.S. Cl. ........... 29/888.048; 29/888.04; 29/888.043; 29/888.049
(58) Field of Classification Search .............. 29/888.04, 29/888.041, 888.043, 888.048, 402.18, 527.1, 29/527.2, 530, 888.042, 888.044, 888.049; 92/208, 222, 223, 224, 231, 260
See application file for complete search history.

(56) References Cited

U.S. PATENT DOCUMENTS

| | | | | | |
|---|---|---|---|---|---|
| 2,685,729 | A | * | 8/1954 | Bower et al. | 29/888.047 |
| 3,413,897 | A | * | 12/1968 | Atkin | 92/186 |
| 4,074,616 | A | * | 2/1978 | Gale et al. | 92/222 |
| 4,125,926 | A | * | 11/1978 | Gale et al. | 29/888.043 |
| 4,387,627 | A | * | 6/1983 | Avezou | 92/222 |
| 4,562,327 | A | * | 12/1985 | Mielke | 219/76.11 |

(Continued)

FOREIGN PATENT DOCUMENTS

| | | |
|---|---|---|
| DE | 279 203 A1 | 5/1990 |
| DE | 279290 A1 | 5/1990 |
| DE | 196 49 363 C2 | 6/1997 |
| DE | 19649363 A1 | 6/1997 |

(Continued)

OTHER PUBLICATIONS

Human translation of JP 04092163 A, Mar. 25, 1992, Shigekado.*

*Primary Examiner* — David Bryant
*Assistant Examiner* — Ryan J Walters
(74) *Attorney, Agent, or Firm* — Robert L. Stearns; Dickinson Wright PLLC

(57) ABSTRACT

The invention relates to a method for producing an internal combustion engine piston which is provided with at least one cooling channel (12) and at least one reinforced piston ring groove (14) consisting in producing a piston blank (1), in forming a groove (10) provided with a cooling channel (12) and an external ring (11) in said piston blank (1), in filling the cooling channel (12) with are movable material (2), in filling the external ring with a reinforcing material (3) in removing the removable material (2) and in finish-machining the piston. A piston made of aluminum alloy and produced according to the inventive method is also disclosed.

7 Claims, 2 Drawing Sheets

U.S. PATENT DOCUMENTS

| | | | | |
|---|---|---|---|---|
| 4,643,079 A | * | 2/1987 | Brann et al. | 92/222 |
| 5,144,885 A | * | 9/1992 | Suzuki et al. | 92/222 |
| 5,653,021 A | * | 8/1997 | Matsuyama et al. | 29/888.049 |
| 5,737,838 A | * | 4/1998 | Niimi et al. | 29/888.047 |
| 2004/0244194 A1 | * | 12/2004 | Appo | 29/888.045 |

FOREIGN PATENT DOCUMENTS

| | | | |
|---|---|---|---|
| DE | 198 07 176 C2 | | 10/1999 |
| JP | 03138438 A | | 6/1991 |
| JP | 04092163 A | * | 3/1992 |
| JP | 2000213413 A | | 8/2000 |

* cited by examiner

METHOD FOR PRODUCING A PISTON FOR AN INTERNAL COMBUSTION ENGINE AND THE THUS PRODUCED PISTON

BACKGROUND OF THE INVENTION

1. Technical Field

The present invention relates to a method for the production of a piston for an internal combustion engine with at least one cooling channel and at least one reinforced piston ring groove and to a piston thus produced.

2. Related Art

Passenger car pistons, in particular pistons in diesel engines in passenger cars are exposed to high temperatures and pressures in use. For this reason, efficient cooling of the piston and reinforcement of points subject to high mechanical stresses is necessary. To this end, pistons for passenger car diesel engines are generally provided with cooling channels through which cooling oil and/or another coolant is passed to remove the heat from the piston.

A process for producing a piston with a cooling channel is known from DE 196 49 363 C2, for instance, in which a salt lost core is inserted in a cavity in a casting mould for a piston. The lost core is washed out after casting and solidification.

A process is further known whereby the piston is made with a reinforced or armoured ring carrier because of the high contact stress and wear stress in the first annular groove. In this regard, a process is known, for instance, whereby the ring carrier is integrated into the piston by means of what is known as the Alfin process. In this regard, the aluminium alloy piston is bonded with steel or cast iron during the casting process. To do this, the ring carrier must first be immersed in an aluminium-silicon melt (Al—Si melt). The ring carriers coated with the liquid melt are inserted into the casting tool and cast in.

DE 196 49 363 C2 discloses a process for forming an armoured annular groove in which the lost core is made from salt with an outer ring that is located at the position of the subsequent ring carrier in the piston. The outer ring is removed after the piston is cast and the space thus created is filled with a reinforcing material.

A significant share of the production costs of a piston for a diesel engine can be attributed to the production and/or manual insertion of an insert, such as the lost core. Furthermore, fluctuations in the positioning of the insert parts can lead to faults in production. Additionally, automated production of the pistons is not possible, or is only possible at high costs, because of the insert parts.

SUMMARY OF THE INVENTION

It is therefore the object of the present invention to create a simple method by which it is possible to produce a piston with a cooling channel and a reinforced piston ring groove in an automated manner, and a piston thus produced.

First a piston blank is created. A groove comprising the cooling channel and an outer ring is then machined into the piston blank. The cooling channel is then filled with a removable material. The outer ring is filled with a reinforcing material. The removable material is then removed from the cooling channel and the piston finished. This gives a piston having a cooling channel and formed with at least one reinforced annular groove. All steps in the process can be automated. The piston blank can be produced without inserts at least in the area of the cooling channel.

The piston blank is preferably produced by a casting technique. A simple casting mould without insert parts and/or undercuts may be used here. Furthermore, it is possible to produce pistons with different cooling channels with a single casting mould.

Turning the groove in the piston blank is a particularly preferred method. Since a piston has a form that is essentially rotationally symmetrical, automated machining of the piston blank on a lathe can be implemented at low-cost.

In a further embodiment, a salt material is inserted in the cooling channel as the removable material. A salt core can be cheaply washed out of the cooling channel after the outer ring has been filled with the reinforcing material.

The reinforcing material is preferably welded into the outer ring. The outer ring is in this regard preferably completely filled with the reinforcing material. It is conceivable that the reinforcing material be applied in multiple layers.

In a further embodiment, the reinforcing material is injected into the outer ring by a laser injection process. Since the cooling channel is filled with a removable material, for instance the salt, the reinforcing material can be applied to the outer ring by a laser injection process or by a welding process without the need to protect this with a covering ring.

It is particularly preferred that at least the first annular groove is machined into the outer piston edge during finishing of the piston. Additionally, it is also conceivable that the reinforcing material be applied in such a way that an annular groove is formed at the same time. However, the two operations are better automatable if the outer ring is completely filled and the annular groove then machined.

The object is further solved by a piston which is produced by a method according to the invention wherein the piston is produced from an aluminium alloy and the reinforcing material consists of metal, metal alloy or cermet. These materials are particularly suited to the production of a piston with the desired properties.

The reinforcing material preferably consists of a nickel-copper alloy or of high-grade steel. These materials are particularly suited to the application of the reinforcing material by a welding process.

In a further embodiment, the reinforcing material consists of a nickel alloy. Nickel alloys are particularly suited to the application of the reinforcing material by a laser injection process.

BRIEF DESCRIPTION OF THE DRAWINGS

The invention will be described below using exemplary preferred embodiments. This description uses the same reference numerals for the same components.

The drawings show.

DETAILED DESCRIPTION OF A PREFERRED EMBODIMENT OF THE INVENTION

Figure 1:
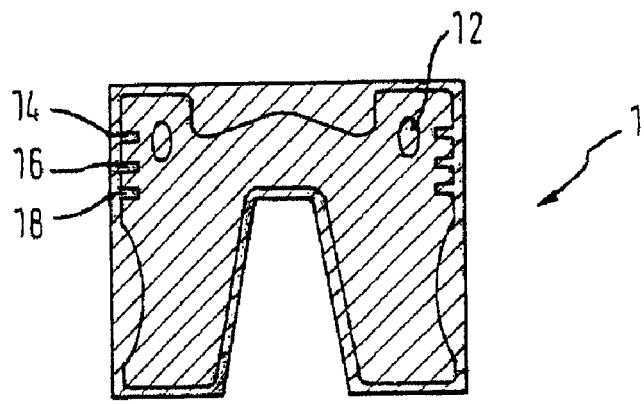
FIG. 1 a schematic representation of a piston blank.

FIG. 1 shows schematically a piston blank 1. A line indicates the subsequent form of the finished piston. The finished piston comprises a cooling channel 12 and annular grooves 14, 16, 18, wherein at least the first annular groove is reinforced. Piston blank 1 may be produced by an appropriate casting technique.

Figure 2:
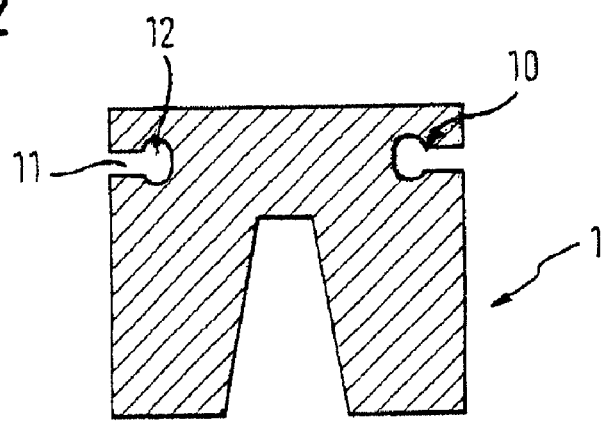
FIG. 2 the piston blank according to FIG. 1 with a groove machined into it.

FIG. 2 shows schematically the piston blank 1 according to FIG. 1, wherein a groove 10 has been machined into the piston blank 1. The groove 10 comprises the cooling channel 12 and an outer ring 11. The outer ring 11 may in this regard either be formed with a constant width as illustrated here, or may be tapered. The groove 10 is preferably turned into the piston blank 1. The cooling channel 12 is then filled with a removable material, for example salt.

Figure 3:
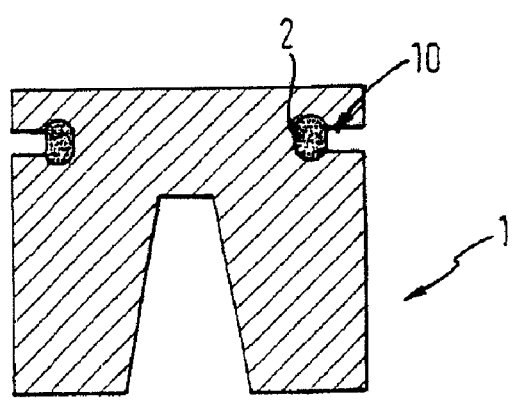
FIG. 3 the piston blank according to FIG. 2 with a cooling channel filled with a removable material.

FIG. 3 shows schematically the piston blank 1, wherein the cooling channel 12 is filled with the removable material 2. In this regard the outer ring 11 is not filled with the removable material 2.

The removable material 2 is preferably inserted in the cooling ring in an easily deformable state. Once the removable material 2 has hardened, the outer ring 11, which is not filled with the removable material, is filled with a reinforcing material 3.

Figure 4:
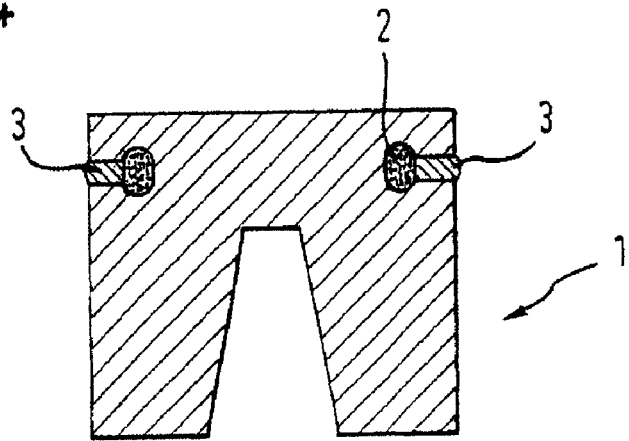
FIG. 4 the piston blank according to FIG. 3 with an outer ring filled with a reinforcing material.

FIG. 4 shows schematically the piston blank 1, wherein the cooling channel is filled with the removable material 2 and the outer ring 11 is filled with the reinforcing material 3. The reinforcing material 3 is applied by a welding process, for example. The cooling channel 12 is completely protected by the removable material 2 so that no additional cover ring is required to separate the cooling channel 12 from the reinforcing material 3. Instead of completely filling the outer ring 11 with the reinforcing material 3 as illustrated, it is also conceivable that the outer ring 11 be filled with reinforcing material 3 except for annular groove 14. It is additionally conceivable that different reinforcing materials be applied in multiple layers.

Figure 5:
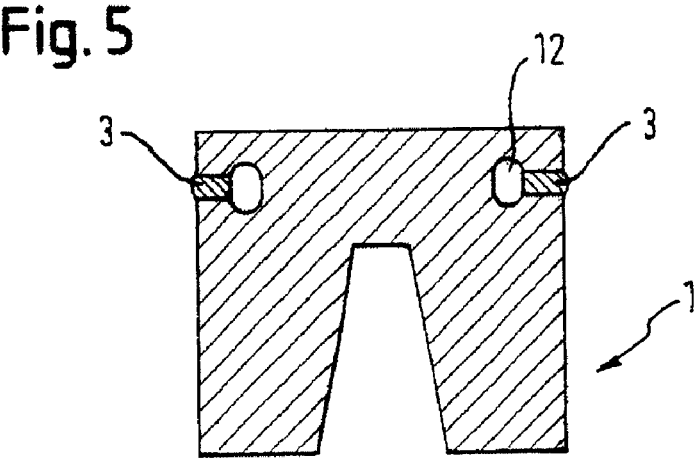
FIG. 5 the piston blank according to FIG. 4 with the removable material having been removed from the cooling channel, and FIG. 6 a finished piston.

FIG. 5 shows schematically the piston blank 1, wherein removable material 2 has been removed from the cooling channel 12. It is possible to remove material 2 by washing it out, for instance. Piston blank 1 with the cooling channel 12 formed in it and the reinforcing material can then be finished by machining.

Figure 6:
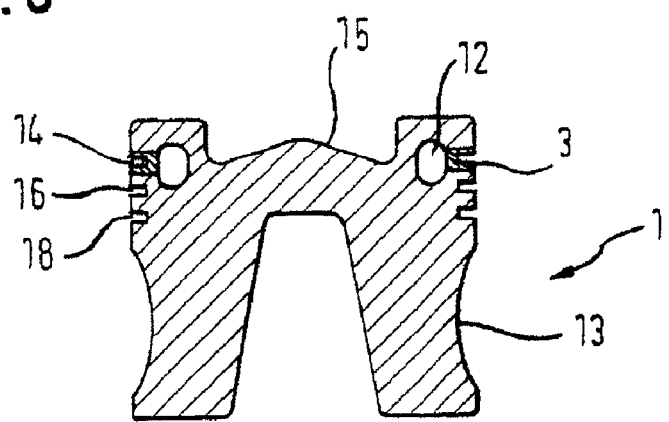

FIG. 6 shows schematically a finished machined piston with the desired properties. The piston comprises the cooling channel 12 and annular grooves 14, 16, 18. The first annular groove 14 is additionally protected by the reinforcing material against high surface contact pressure and wear stress. Additionally, the walls of the piston 13 have been machined and a combustion bowl 15 has been made on the piston. Further steps in the manufacture of the piston are also conceivable.

The method for the production of the piston contains only steps that can be automated, for example in a machining line. Machining the groove into the piston blank allows more precise formation of the cooling channel than does the use of known insert parts.

The invention claimed is:

1. Method for the production of a piston for an internal combustion engine with at least one cooling channel and at least one armored piston ring groove with the following steps performed in order:
   producing a piston blank,
   machining a groove into the piston blank comprising the cooling channel and an outer ring,
   filling the cooling channel with a removable material,
   filling the outer ring with a reinforcing material,
   and removing the removable material, and
   and the method further comprising finishing the piston before or after removing the removable material.

2. The method according to claim 1, wherein the piston blank is produced by a casting technique.

3. The method according to claim 1 wherein the groove is machined by turning.

4. The method according to claim 1, wherein a salt material is placed in the cooling channel as the removable material.

5. The method according to claim 1, wherein the reinforcing material is welded into the outer ring.

6. The method according to claim 1, wherein the reinforcing material is injected into the outer ring by a laser injection method.

7. The method according to one claim 1, wherein at least one annular groove is machined into the outer piston wall during finishing.

* * * * *